(12) United States Patent
Phelan et al.

(10) Patent No.: US 8,648,491 B2
(45) Date of Patent: Feb. 11, 2014

(54) PASSIVE IMPEDANCE MATCHING

(75) Inventors: Andrew James Phelan, Magnolia, TX (US); Michael Stearns, Cypress, TX (US); Minh H. Nguyen, Katy, TX (US); Chanh V. Hua, Houston, TX (US); Raghavan V. Venugopal, Spring, TX (US); David Paul Mohr, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 664 days.

(21) Appl. No.: 12/892,300

(22) Filed: Sep. 28, 2010

(65) Prior Publication Data

US 2012/0074783 A1    Mar. 29, 2012

(51) Int. Cl.
*H02J 3/00*    (2006.01)

(52) U.S. Cl.
USPC .............................................. 307/13; 307/43

(58) Field of Classification Search
USPC ................................................ 307/12, 13, 43
See application file for complete search history.

(56) References Cited

U.S. PATENT DOCUMENTS

| 6,215,290 B1 | 4/2001 | Yang et al. | |
| 6,302,709 B1 * | 10/2001 | Ross | 439/78 |
| 2002/0153777 A1 * | 10/2002 | Dishman et al. | 307/64 |

* cited by examiner

*Primary Examiner* — Carlos Amaya (57) ABSTRACT

Methods, devices, and systems for passive impedance matching are provided. An example of a method of passive impedance matching includes provided a substantially equivalent impedance between a source and a load for three single-phase power supplies via a geometry of a busbar. The busbar can be coupled to the three-phase power supplies as the source and coupled to a plurality of electronic machines as the load.

14 Claims, 6 Drawing Sheets

PASSIVE IMPEDANCE MATCHING

BACKGROUND

Three-phase electric power may be used as a method of alternating current electric power transmission. A three-phase system may be more economical than others because it may use less conductor material to transmit electric power than equivalent single-phase or two-phase systems at the same voltage. In a three-phase system, three conductors carry three alternating currents of the same frequency, which reach their instantaneous peak values at different times.

The currents of each phase may cancel each other out and sum to zero in the case of a linear balanced load. Power transfer to a linear balanced load may be constant. However, in some instances, a load may not be naturally balanced. In such instances, it may be advantageous to balance the loads, as overloading one phase over another can increase power consumption fees and call for more infrastructure capacity than a balanced load would.

For instance, in the case of a datacenter, individual computing devices (e.g., servers) may use only one or two of the three phases. Even if the same amount of servers are put on every phase, differing server loads may cause an unbalance in the system.

Some previous approaches to load balancing multi-phase and/or multi-module power supplies have employed active load balancing. For example, a multi-phase power supply can use a current sensor including a sensor inductor winding in parallel with a filter inductor winding at an output of each phase for sensing the phase currents and balancing the current by adjusting the duty cycle of each phase through feedback control. However, such active systems may use power and may be expensive to implement in terms of design, deployment, and use of space within a datacenter and/or various components thereof.

DETAILED DESCRIPTION

Embodiments of the present disclosure may include methods, devices, and systems for passive impedance matching. An example of a method of passive impedance matching includes providing a substantially equivalent impedance between a source and a load for three single-phase power supplies via a geometry of a busbar. The busbar can be coupled to three single-phase power supplies as the source and coupled to a plurality of electronic machines as the load.

Examples of the present disclosure can provide for passive impedance matching and/or load balancing three single-phase power supplies at an enclosure level and still provide for an option to have redundancy for additional single-phase power inputs. Examples of busbars according to the present disclosure can impedance match a multi-input power supply to a single connection causing each input from the multi-input power supply to see the same load, even if the load of individual electronic machines using the supplied power is different. When examples of the present disclosure are used with server racks, a consistent method of balancing rack loads without managing individual server loads is provided.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the designator "N," including reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
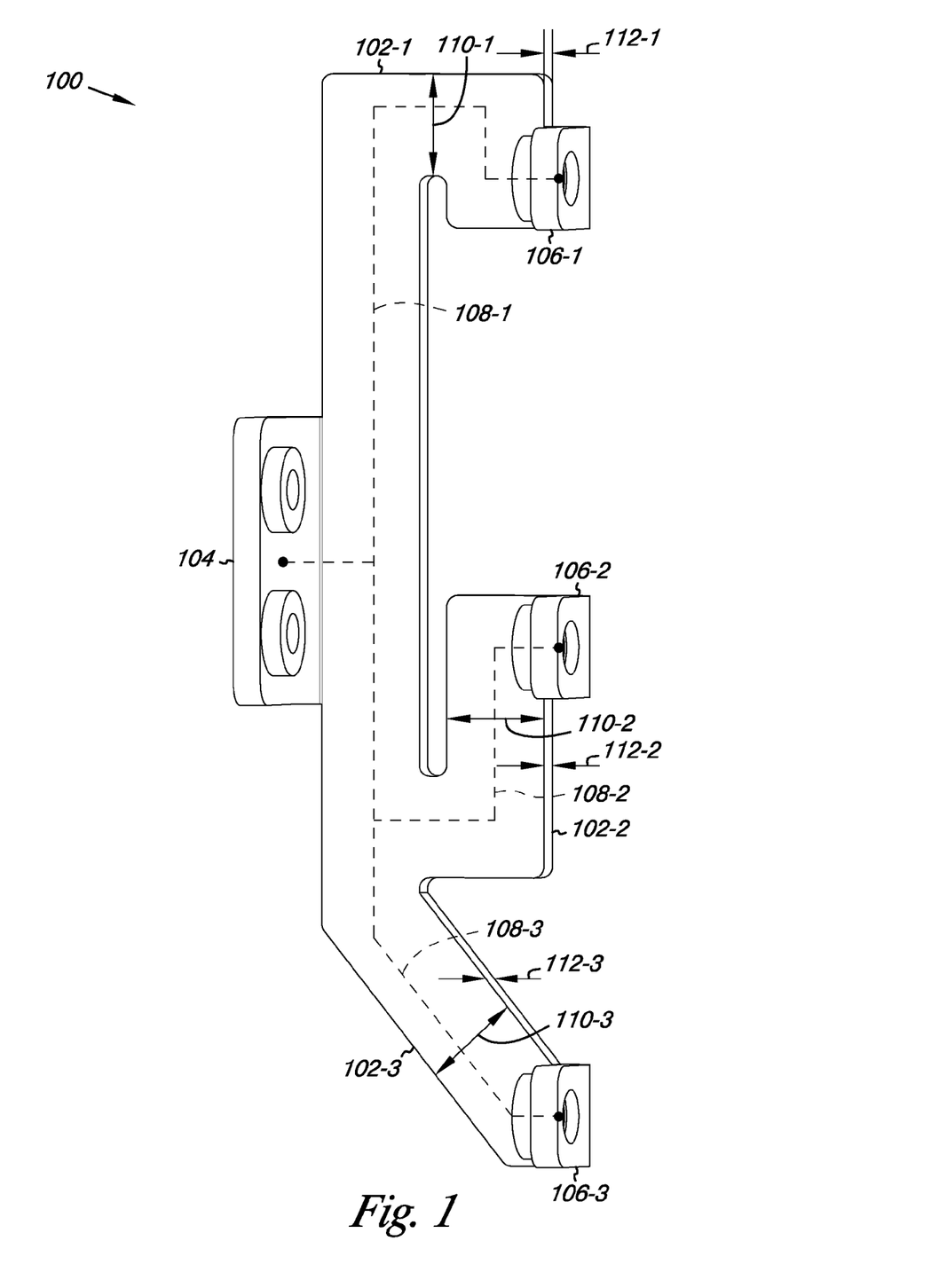
FIG. 1 illustrates a perspective view of an example of a busbar for passive impedance matching according to the present disclosure.
Figure 2A:
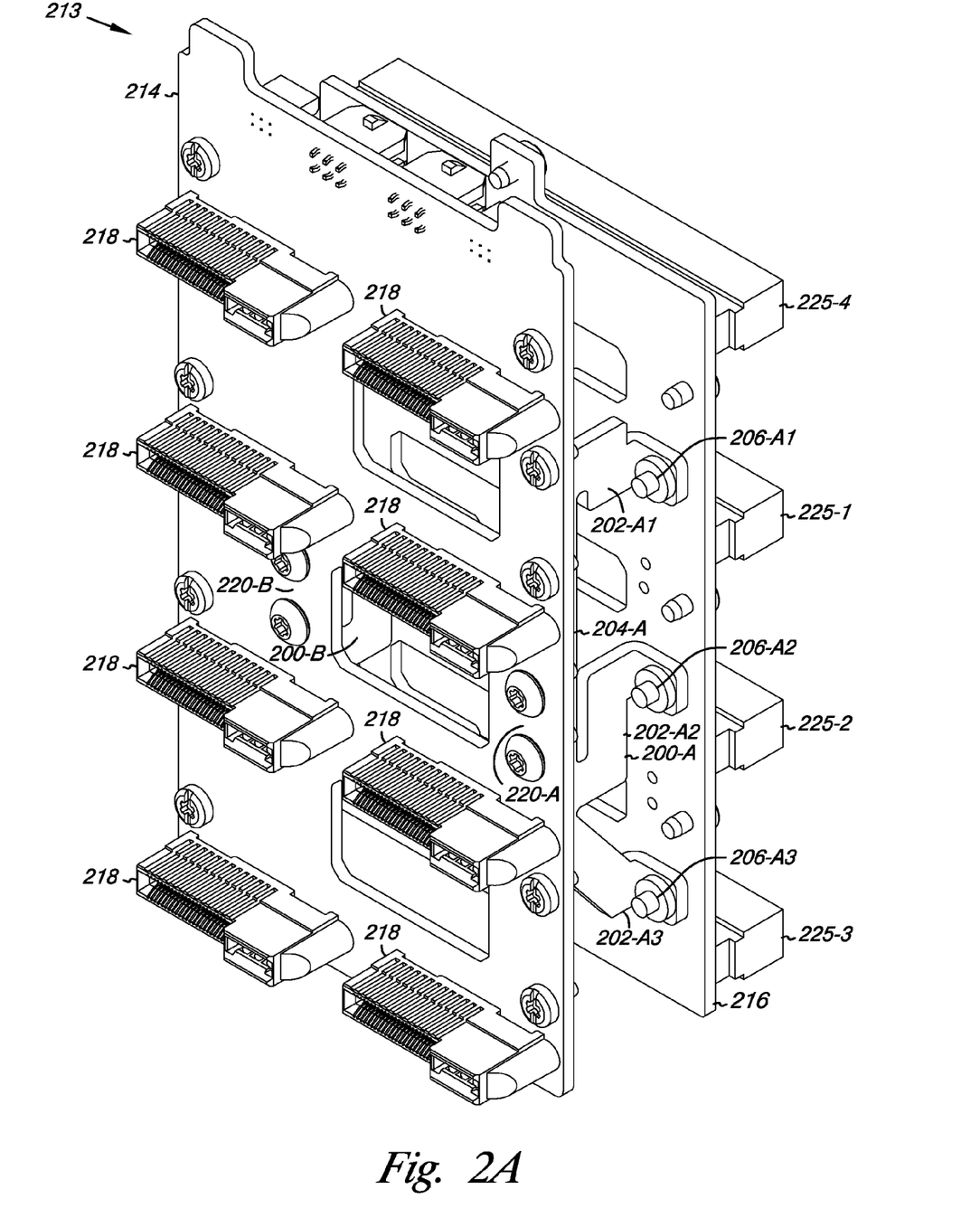
FIG. 2A illustrates a rear perspective view of an example of an assembly for passive impedance matching according to the present disclosure.
Figure 2B:
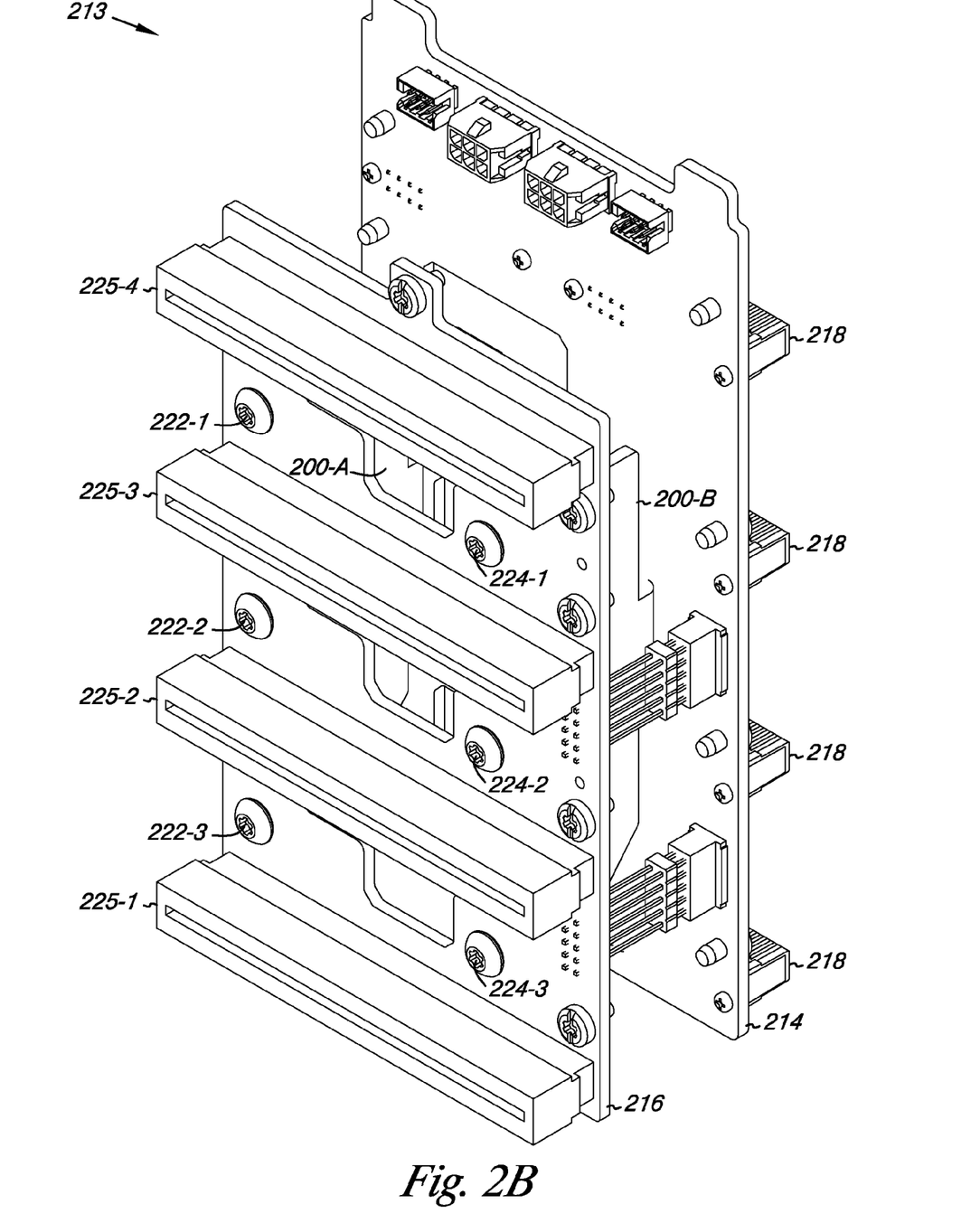
FIG. 2B illustrates a front perspective view of an example of an assembly for passive impedance matching according to the present disclosure.

FIG. 1 illustrates a perspective view of an example of a busbar 100 for passive impedance matching according to the present disclosure. A busbar is a component of an electrical system that conducts electricity and/or distributes current between one or more sources and one or more loads. For example, a household circuit breaker panel board may include busbars at the back, arranged for the connection of multiple branch circuit breakers. Busbars may be formed of a conductive metal (e.g., copper, aluminum, etc.). Busbars may be connected to each other and/or to other devices by bolted or clamped connections, among others.

The busbar 100 includes a first leg 102-1 connected between a common tie point 104 and a first terminal 106-1. The busbar 100 includes a second leg 102-2 connected between the common tie point 104 and a second terminal 106-2. The busbar 100 includes a third leg 102-3 connected between the common tie point 104 and a third terminal 106-3. A geometry of each of the first 102-1, the second 102-2, and the third 102-3 legs can provide a substantially equivalent impedance for each of the first 102-1, the second 102-2, and the third 102-3 legs between the respective terminals 106-1, 106-2, 106-3 and the common tie point 104. For example, the substantially equivalent impedance can be within a deviation of 5% between any two of the first 102-1, the second 102-2, and the third 102-3 legs.

Figure 3A:
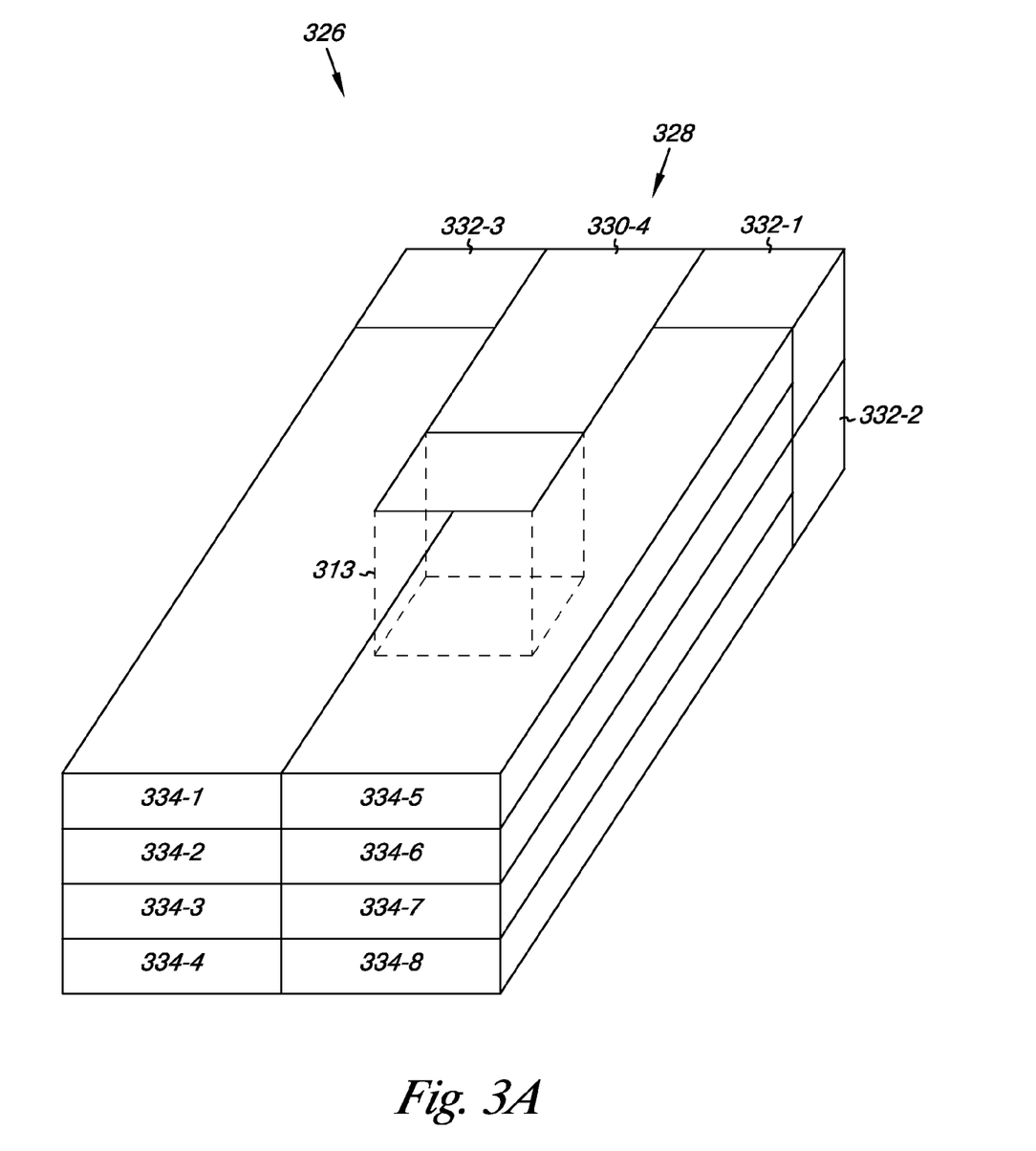
FIG. 3A illustrates a front perspective view of an example of a chassis for passive impedance matching according to the present disclosure.
Figure 3B:
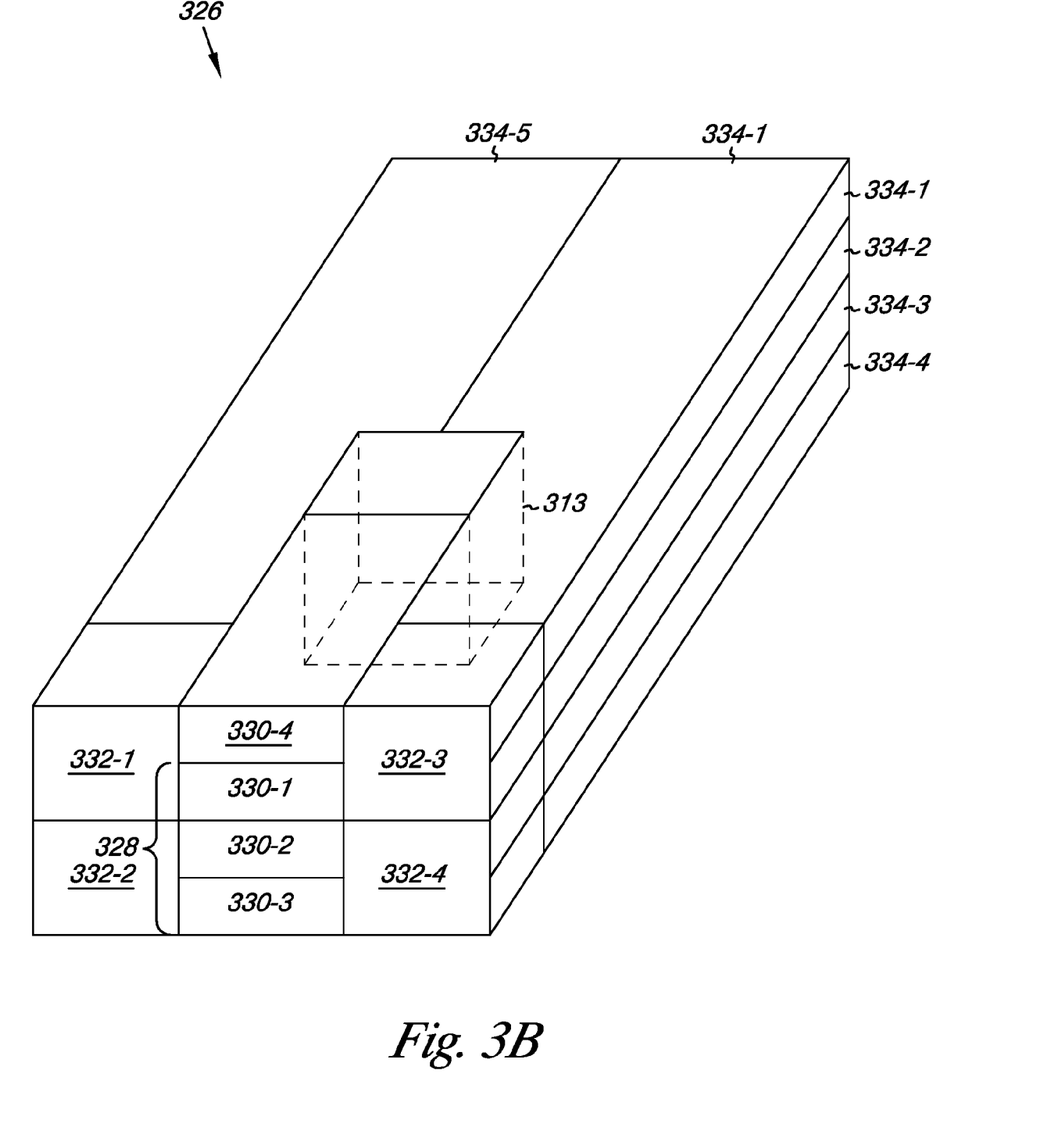
FIG. 3B illustrates a rear perspective view of an example of a chassis for passive impedance matching according to the present disclosure.

The relative positions of the first 106-1, the second 106-2, and the third 106-3 terminals can be predefined by a form factor for three single-phase power supplies (e.g., three single-phase power supplies 328 illustrated in FIG. 3B). That is, each terminal 106-1, 106-2, 106-3 can correspond to an input from a respective power supply module (e.g., power supply modules 330-1, 330-2, 330-3 illustrated in FIG. 3B) of an input from three single-phase power supplies. Any one of the three single-phase power supplies can convert a single-phase alternating current (AC) power supply (e.g., in a range between 110 volts and 240 volts) to direct current (DC) (e.g., 12 volts DC).

The terminals can be connected to another device by screws, bolts, and/or lugs, among other connection mechanisms. The common tie point 104 can be connected to a power distribution board (e.g., power backplane 216 illustrated in FIG. 2A) to distribute power to electronic machines, which draw a load from the power supply. The common tie point 104 can include a number of apertures for connecting to another device (e.g., a printed circuit board). In some examples, the number of apertures can be proportional to a current density to be handled by the busbar 100 where higher current densities can utilize a greater number of apertures for connecting to the other device and delivering the electrical load thereto.

According to a number of examples of the present disclosure, the busbar 100 can be made of a particular material (e.g., a conductive metal such as copper). The first leg 102-1 has a first length 108-1, a first width 110-1, and a first thickness 112-1. The second leg 102-2 has a second length 108-2, a second width 110-2, and a second thickness 112-2. The third leg 102-3 has a third length 108-3, a third width 110-3, and a third thickness 112-3. In some examples, one or more of the width or the thickness of a particular leg can vary along its length. In some examples, the thickness of the busbar 100 can be at least 0.1 inches where the busbar 100 is made of copper.

The geometry of at least one of the first 102-1, the second 102-2, and the third 102-3 legs can be different from a remainder of the first 102-1, the second 102-2, and the third 102-3 legs. in some examples, each of the first 102-1, the second 102-2, and the third 102-3 legs can have different geometries. The geometries can differ by one or more of thickness, length, and width to provide the substantially equivalent impedance. For a particular leg, an increase in any one of length, width, or thickness can increase an impedance associated with the particular leg. By way of example, the third leg 102-3 appears to make a fairly straight (thus, "short") run from the common tie point 104 to the third terminal 106-3, while the first 102-1 and the second 102-2 legs snake around a bit more between the common tie point 104 and the first 106-1 and the second 106-2 terminals respectively, rather than taking a shorter direct route, thus increasing their respective impedances relative to a similar leg that would travel directly between the common tie point 104 and the first 106-1 and the second 106-2 terminals.

FIG. 2A illustrates a rear perspective view of an example of an assembly 213 for passive impedance matching according to the present disclosure. FIG. 2B illustrates a front perspective view of an example of an assembly 213 for passive impedance matching according to the present disclosure. The assembly 213 includes a tray backplane 214 including a first electrical interconnect 220-A and a second electrical interconnect 220-B coupled to a plurality of nodes 218. The plurality of nodes 218 can be used to connect the tray backplane 214 to a plurality of electronic machines (e.g., electronic machines 334 illustrated in FIGS. 3A-3B).

The first electrical interconnect 220-A can be coupled to a common tie point (e.g., common tie point 104 illustrated in FIG. 1) of a first busbar 200-A. The first electrical interconnect 220-A can receive electrical power from a power supply (e.g., power supply 328 illustrated in FIG. 3A-3B) via the first busbar 200-A. The first electrical interconnect 220-A can distribute the electrical power to the plurality of nodes 218 via the tray backplane 214.

The second electrical interconnect 220-B can be coupled to a common tie point (e.g., common tie point 104 illustrated in FIG. 1) of a second busbar 200-B. The second electrical interconnect 220-B can provide a ground return to the power supply via the second busbar 200-B. The second electrical interconnect 220-B can provide a ground return from the plurality of nodes 218 via the tray backplane 214.

The assembly 213 includes a power backplane 216 including three power supply inputs 222-1, 222-2, 222-3 and three ground returns 224-1, 224-2, 224-3. In some examples of the present disclosure, the tray backplane 214 and/or the power backplane 216 can be printed circuit boards (PCBs). The power supply inputs 222-1, 222-2, 222-3 and ground returns 224-1, 224-2, 224-3 can be coupled to the power supply connectors 225-1, 225-2, 225-3, 225-4 via the power backplane 216. The power supply connectors 225-1, 225-2, 225-3, 225-4 can each be connected to a respective power supply module (e.g., power supply modules 330 illustrated in FIG. 3B).

The power supply inputs 222-1, 222-2, 222-3 can input electrical power from power supply modules (e.g., power supply modules 330 illustrated in FIG. 3B) via the power backplane 216 to the first busbar 200-A, and through the first busbar 200-A to the tray backplane 214 as described herein. The power supply inputs 222-1, 222-2, 222-3 can each be connected to a respective leg 202-A1, 202-A2, 202-A3 of the first busbar 200-A via a respective terminal 206-A1, 206-A2, 206-A3 of the first busbar 200-A.

The ground returns 224-1, 224-2, 224-3 can provide a ground return to the power supply modules (e.g., power supply modules 330 illustrated in FIG. 3B) via the power backplane 216 from the second busbar 200-B, and through the second busbar 200-B from the tray backplane 214 as described herein. The ground returns 224-1, 224-2, 224-3 can each be connected to a respective leg 202-B1, 202-B2, 202-B3 of the second busbar 200-B via a respective terminal 206-B1, 206-B2, 206-B3 of the second busbar 200-B.

The assembly 213 includes a first busbar 200-A coupled between the tray backplane 214 and the power backplane 216. The first busbar 200-A includes three first terminals 206-A1, 206-A2, 206-A3 connected to three power supply inputs 222-1, 222-2, 222-3. The first busbar 200-A includes a first common tie point 204-A coupled to the first electrical interconnect 220-A. The first busbar 200-A includes three first legs 202-A1, 202-A2, 202-A3, each first leg 202-A1, 202-A2, 202-A3 running from one of the three first terminals 206-A1, 206-A2, 206-A3 to the first common tie point 204-A. A geometry of each of the first legs 202-A1, 202-A2, 202-A3 provides a substantially equivalent impedance between the three power supply inputs 222-1, 222-2, 222-3 and the first electrical interconnect 220-A.

The assembly 213 includes a second busbar 200-B coupled between the tray backplane 214 and the power backplane 216. The second busbar 200-B includes three second terminals 206-B1, 206-B2, 206-B3 connected to three ground returns 224-1, 224-2, 224-3. The second busbar 200-B includes a second common tie point 204-B coupled to the second electrical interconnect 220-B. The second busbar 200-B includes three second legs 202-B1, 202-82, 202-B3, each second leg 202-B1, 202-B2, 202-B3 running from one of the three second terminals 206-B1, 206-B2, 206-83 to the second common tie point 204-B. A geometry of each of the second legs 202-B1, 202-B2, 202-B3 provides a substantially equivalent impedance between the three ground returns 224-1, 224-2, 224-3 and the second electrical interconnect 220-B.

Although not specifically illustrated in FIGS. 2A-2B, the assembly 213 can include a case and/or shielding around an exterior of the tray backplane 214 and the power backplane 216. Examples including such shielding can provide electrical and/or thermal insulation for the assembly 213 as well as structural support for the assembly 213.

FIG. 3A illustrates a front perspective view of an example of a chassis 326 for passive impedance matching according to the present disclosure. FIG. 3B illustrates a rear perspective view of an example of a chassis 326 for passive impedance matching according to the present disclosure. The chassis 326 can include an assembly 313. The assembly 313 can be analogous to the assembly 213 described above with respect to FIGS. 2A-2B (e.g., including at least a tray backplane, power backplane, and two busbars). In some examples of the present disclosure, the assembly 313 can be swappable from the chassis 326.

The chassis 326 can include three single-phase power supplies 328. The three single-phase power supplies 328 can include separate power supply modules 330-1, 330-2, 330-3 for each phase. Each power supply module 330-1, 330-2, 330-3 can be coupled to a respective one of the three power supply inputs (e.g., power supply inputs 222-1, 222-2, 222-3 illustrated in FIGS. 2A-2B) and a respective one of the three ground returns (e.g., ground returns 224-1, 224-2, 224-3 illustrated in FIGS. 2A-2B). In some examples, a particular power supply module can be coupled to a particular powers supply input and a particular ground return by a power supply connector (e.g., power supply connector 225-1 illustrated in FIGS. 2A-2B). In various examples, the chassis 326 can include a fourth power supply module 330-4 coupled to one of the three power supply inputs. The fourth power supply module 330-4 can provide a redundant and/or additional power source. The power supply modules 330-1, 330-2, 330-3, and 330-4 can be individually swappable from the chassis 326. Any one of the power supply modules 330-1, 330-2, 330-3, 330-4 can convert a single-phase of an AC power supply (e.g., in a range between 110 volts and 240 volts) to DC (e.g., 12 volts DC).

The chassis 326 can include a plurality of electronic machines 334-1, 334-2, 334-3, 334-4, 334-5, 334-6, 334-7, 334-8 (collectively referenced by numeral 334). Each of the plurality of electronic machines 334 is coupled to a respective one of the plurality of nodes (e.g., nodes 218 illustrated in FIGS. 2A-2B). Although the examples illustrated in FIGS. 2A-3B include eight nodes and eight electronic machines, the present disclosure is not so limited as more or fewer nodes and/or electronic machines can be included. The electronic machines 334 can be computing devices such as servers and the like, network devices such as routers, switches, hubs and the like, and/or non-volatile storage devices such as hard drives, solid state drives, etc. The electronic machines 334 can be individually swappable from the chassis 326. The chassis 326 can be rack mountable (e.g., in a server rack where the electronic machines 334 are servers).

An electronic machine 334 (e.g., a computing device) can include a tangible non-transitory medium storing a set of machine readable instructions. Such a tangible non-transitory medium can include volatile and/or non-volatile memory such as random access memory (RAM), magnetic memory such as a hard disk, floppy disk, and/or tape memory, a solid state drive (SSD), flash memory, phase change memory, and the like.

The chassis 326 can include a number of cooling units 332-1, 332-2, 332-3, 332-4 (e.g., fans). The cooling units (collectively referenced by numeral 332) can be individually swappable from the chassis 326. The cooling units 332 can provide cooling for the power supply modules 330-1, 330-2, 330-3, 330-4 and/or the electronic machines 334.

Figure 4:
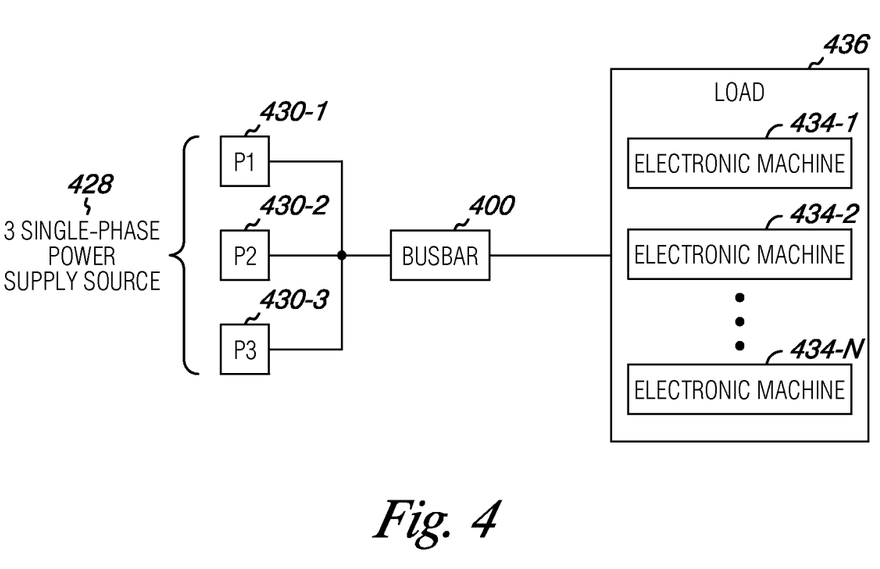
FIG. 4 provides a block diagram illustrating an example of passive impedance matching according to the present disclosure.

FIG. 4 provides a block diagram illustrating an example of passive impedance matching according to the present disclosure. A substantially equivalent impedance can be provided between a source 428 and a load 436 for three single-phases 430-1, 430-2, 430-3 (e.g., P1, P2, P3 as illustrated in FIG. 4) of a power supply 428 via a geometry of a busbar 400. The busbar 400 can be coupled to the three single-phase power supplies 428, which is the source. The busbar 400 can be coupled to a plurality of electronic machines 434-1, 434-2, . . . , 434-N, which are the load 436 on the source 428. Providing the substantially equivalent impedance between the source 428 and the load 436 can include providing an impedance between the source 428 and the load 436 within a deviation of 5% between two of the three single-phases 430-1, 430-2, 430-3 and any other two of the three single-phases 430-1, 430-2, 430-3.

Providing the substantially equivalent impedance can include providing a substantially same load on all three single-phases 430-1, 430-2, 430-3 of the power supplies 428 when each of the plurality of electronic machines 434-1, 434-2, . . . , 434-N is using a different amount of power (e.g., creating a different individual load on the supplies 428). In such examples, each of the electronic machines 434-1, 434-2, . . . , 434-N can be coupled to the supplies 428 by a common tie point, as described herein. The substantially equivalent impedance can be provided between the source 428 and the load 436 at an enclosure level for a chassis including the three single-phase power supplies 428 and the plurality of electronic machines 434-1, 434-2, . . . , 434-N.

Providing the substantially equivalent impedance via the geometry of the busbar 400 includes providing the busbar 400 with three legs connected between three respective terminals and a common tie point, as described herein. A geometry of at least one of the three legs can differ from a remainder of the three legs by one or more of thickness, length, and width, as described herein.

It is to be understood that the above description has been made in an illustrative fashion, and not a restrictive one. Although specific examples have been illustrated and described herein, other component arrangements, instructions, and/or device logic can be substituted for the specific examples shown.

What is claimed:

1. A method of passive impedance matching, comprising:
   providing a substantially equivalent impedance between a source and a load for three single-phase power supplies via a geometry of a busbar with three legs, wherein a geometry of at least one of the three legs differs from a remainder of the three legs by one or more of thickness, length, and width;
   coupling the busbar to the three single-phase power supplies as the source; and
   coupling the busbar to a plurality of electronic machines as the load.

2. The method of claim 1, wherein providing the substantially equivalent impedance includes providing an impedance between the source and the load within a deviation of 5% between two of the three single-phases and any other two of the three single-phases.

3. The method of claim 1, wherein providing the substantially equivalent impedance via the geometry of the busbar includes providing the busbar with three legs connected between three respective terminals and a common tie point.

4. The method of claim 1, wherein providing the substantially equivalent impedance includes providing the substantially equivalent impedance between the source and the load at an enclosure level for a chassis including the three single-phase power supplies and the plurality of electronic machines.

5. The method of claim 1, wherein providing the substantially equivalent impedance includes providing a substantially same load on all three single-phase power supplies when each of the plurality of electronic machines is using a different amount of power.

6. A busbar for passive impedance matching, comprising:
a first leg connected between a common tie point and a first terminal;
a second leg connected between the common tie point and a second terminal; and
a third leg connected between the common tie point and a third terminal;
wherein a geometry of each of the first, the second, and the third legs provides a substantially equivalent impedance for each of the first, the second, and the third legs between the respective terminals associated with a supply and the common tie point associated with a load; and
wherein the geometry of each of the first, the second, and the third legs differs from others of the first, the second, and the third legs by one or more of thickness, length, and width to provide the substantially equivalent impedance.

7. The busbar of claim 6, wherein relative positions of the first, the second, and the third terminals are predefined by a form factor for three single-phase power supplies.

8. The busbar of claim 6, wherein the geometry of at least one of the first, the second, and the third legs is different from a remainder of the first, the second, and the third legs.

9. The busbar of claim 6, wherein the substantially equivalent impedance for each of the first, the second, and the third legs is within a deviation of 5% between any two of the first, the second, and the third legs.

10. An electronic system for passive impedance matching, comprising:
a tray backplane, including a first and a second electrical interconnect coupled to a plurality of nodes;
a power backplane including three power supply inputs and three ground returns; and
a first busbar coupled between the tray backplane and the power backplane, wherein the first busbar includes:
three first terminals connected to the three power supply inputs;
a first common tie point coupled to the first electrical interconnect; and
three first legs, each first leg running from one of the three first terminals to the first common tie point;
wherein a geometry of each of the three first legs provides a substantially equivalent impedance between the three power supply inputs and the first electrical interconnect;
a second busbar coupled between the tray backplane and the power backplane, wherein the second busbar includes:
three second terminals connected to the three ground returns;
a second common tie point coupled to the second electrical interconnect; and
three second legs, each second leg running from one of the three second terminals to the second common tie point;
wherein a geometry of each of the three second legs provides a substantially equivalent impedance between the three ground returns and the second electrical interconnect.

11. The system of claim 10, wherein the system comprises a chassis and wherein the chassis further includes:
three single-phase power supplies, including a separate power supply module for each phase, wherein each power supply module is coupled to a respective one of the three power supply inputs and a respective one of the three ground returns; and
a plurality of electronic machines, wherein each of the plurality of electronic machines is coupled to a respective one of the plurality of nodes.

12. The system of claim 11, wherein the plurality of electronic machines are selected from the group of electronic machines including computing devices, network devices, and a non-volatile storage devices.

13. The system of claim 11, wherein the chassis includes a fourth power supply module coupled to one of the three power supply inputs.

14. The system of claim 11, wherein:
the tray backplane, the power backplane, and the first and the second busbars collectively form an assembly, wherein the assembly is swappable from the chassis;
each of the power supply modules is swappable from the chassis; and
each of the electronic machines is swappable from the chassis.

* * * * *